United States Patent [19]

Davis

[11] 4,011,769
[45] Mar. 15, 1977

[54] VEHICLE REAR-VIEW MIRROR MOUNTING ARRANGEMENT

[75] Inventor: Kenneth Paul Davis, Harlington, England

[73] Assignee: Magnatex Limited, Middlesex, England

[22] Filed: Oct. 28, 1975

[21] Appl. No.: 626,125

[30] Foreign Application Priority Data

July 23, 1975 United Kingdom ............ 31285/75

[52] U.S. Cl. .................................. 74/479; 74/509; 248/479

[51] Int. Cl.² ..................... F16D 11/00; A47G 1/24

[58] Field of Search ............ 74/479, 504, 509, 511; 248/479, 485, 484

[56] References Cited

UNITED STATES PATENTS

| | | |
|---|---|---|
| 2,260,597 | 10/1941 | Beattie .......................... 248/485 X |
| 2,315,260 | 3/1943 | Lancaster ........................... 74/479 |
| 2,674,922 | 4/1954 | Robinson ............................ 74/479 |
| 2,713,810 | 7/1955 | Hill ................................ 74/509 X |
| 2,919,599 | 1/1960 | Milton et al. ......................... 74/479 |

*Primary Examiner*—Allan D. Herrmann
*Attorney, Agent, or Firm*—Brisebois & Kruger

[57] ABSTRACT

The orientation of a vehicle rear-view mirror carried by a mirror support member is adjusted from inside a vehicle about a horizontal axis by turning a tubular bearing member, to which the mirror support member is hinged, about its axis by rotating a first control member through a reduction drive and, independently, about a generally vertical axis defined by the axis of the hinge by moving a push member axially in the passage in the tubular bearing member by rotating a second control member.

8 Claims, 3 Drawing Figures

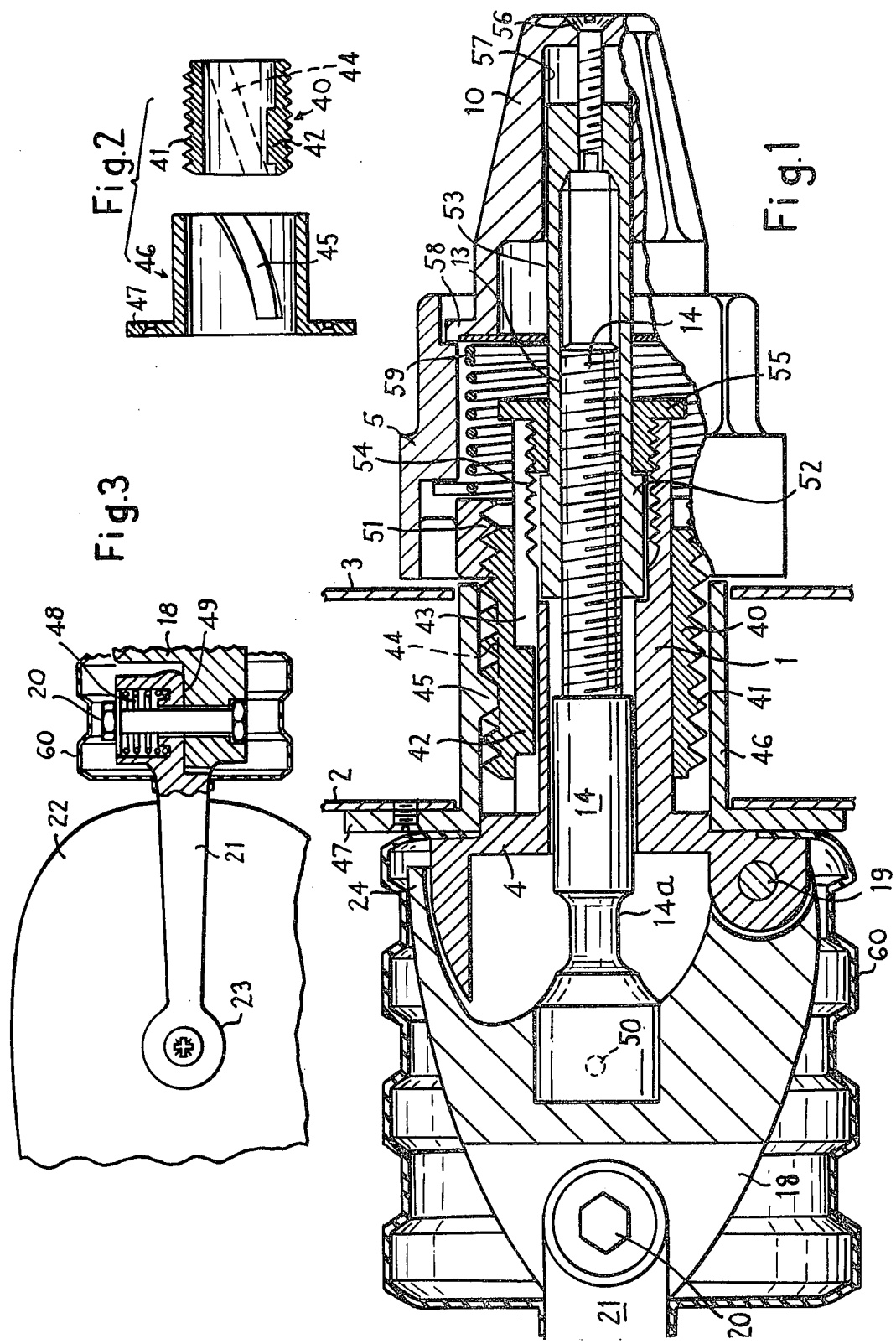

VEHICLE REAR-VIEW MIRROR MOUNTING ARRANGEMENT

BACKGROUND OF THE INVENTION

1. Field of the Invention

This invention relates to a mounting arrangement for mounting a vehicle rear-view mirror on the outside of a vehicle door or other body part and having actuating means extending through the door or body part which is connected to manually-actuable control means situated on the inside of the door or body part for adjusting the orientation of the mirror about both vertical and horizontal axes from inside the vehicle, of the kind described in British patent specification No. 1,321,158.

2. Description of the Prior Art

In British patent specification No. 1,321,158 there is described a rear-view mounting arrangement in which a mirror support can be adjusted about the generally vertical axis of a hinge which is rigidly attached to a part of the vehicle body, by means of an operating level connected to the mirror support and extending into the interior of the vehicle and can be adjusted through a limited angle about a horizontal pivot axis by the same operating lever.

SUMMARY OF THE INVENTION

One object of the present invention is to provide a rear-view mirror mounting arrangement of the kind referred to in which fine adjustment of the mirror support member in particular about a vertical axis can be achieved.

Another object of the present invention to provide a rear-view mirror mounting arrangement of the kind referred to in which the mirror support member is held against accidental turning without the necessity of providing friction washers or additional locking means.

According to the invention, a mounting arrangement of the kind referred to comprises a tubular bearing member adapted to be mounted to extend through and to be turnable in the door or other body part, said bearing member having a mirror support member hinged to its outer end for hinging about an axis extending transversely to the axis of said bearing member and being connected at its inner end through a reduction drive to a first rotatable control member which, when rotated, turns the bearing member about its axis, and a push member axially movable in the passage in the bearing member and coupled at its inner end by a screw thread to a second rotatable control member which is axially captive with the inner end of the bearing member so that rotation of said second control member produces axial movement of said push member and thereby hinging movement of the mirror support member.

In this specification reference to the "outer end" of a component of the mounting arrangement means that end of the component which, when the mounting arrangement is in use, is outside or towards the outside of the vehicle body, and the "inner end" means the opposite end of the component.

The rotatable control members may comprise knobs, handles or levers.

With the mounting arrangement according to the invention a rear-view mirror carried from the mirror support member can be adjusted about a horizontal axis by turning the bearing member about its axis by the first control member and, independently, about a generally vertical axis defined by the axis of the hinge means, by rotating the second control member to move the push member axially outwards or inwards.

Preferably, rotation of the first control member produces axial movement of a key member through a screw-thread drive, and the key member co-operates with guide means inclined at an acute angle to said direction of axial movement to cause the tubular bearing member to turn about its axis as the key member is moved axially. Thereby not only is a fine adjustment of the angular position of the bearing member achieved by the screw-thread reduction drive between the first control member and the key member, but also the screw action of the drive resists turning of the bearing member other than by manually rotating the first control member, so that the bearing member is effectively held against turning by vehicle vibration or wind pressure acting on the mirror without the provision of additional means for locking the first control member against rotation.

The push member may comprise a rod which may be connected to the mirror support member by a link system, or may comprise a rod which may be connected to or integral with the mirror support member and which may itself be flexible for at least part of its length, to allow for the angular movement of the mirror support member about its hinge.

BRIEF DESCRIPTION OF THE DRAWINGS

FIG. 1 is a section through one embodiment of a mounting arrangement according to the invention with the mirror support member in its inner position and with part of a mirror carrying arm broken away, FIG. 2 is an exploded view to a reduced scale of two of the parts of the mounting arrangement of FIG. 1, and FIG. 3 is a section at right angles to the section of FIG. 1 and to a reduced scale of a broken away outer part of the mounting arrangement.

DESCRIPTION OF THE PREFERRED EMBODIMENT

The mirror mounting arrangement shown comprises a tubular bearing member 1 extending between the outer and inner skins 2, 3 respectively of a vehicle door. The bearing member is provided with an enlarged head portion 4 at its outer end which is mounted to rotate in the outer end of a tubular housing 46 which extends between the two skins 2, 3 of the vehicle door and is secured to the outer skin by screws passing through the flange portion 47 of the housing. The outer end of the housing 46 forms a thrust bearing in which the head of the bearing member can turn while holding the bearing member against axial movement toward the inner end of the housing. At its inner end the bearing member 1 is connected to a first control knob 5 for turning the tubular bearing member about a horizontal axis through a screw-thread reduction drive whereby it is held against accidental rotation without the necessity of providing friction washers or additional locking means.

A sleeve 40 having an external screw thread 41 is axially slideable on the outer surface of the tubular bearing member 1 within the space between the bearing member and the housing 46. The sleeve is provided on its inner surface with a key 42 slideable in an axially extending key-way 43 in the outer surface of the bearing member 1, and the outer screw-threaded surface of the sleeve is formed with a groove 44 which extends across the screw thread 41 and is inclined at an acute angle, preferably with a slight helical curvature, to the axial direction of the bearing member 1, said groove 44 co-operating with complementary projecting key 45 on the internal surface of the tubular housing 46. Thus the sleeve constitutes a key member which, as it moves axially of the bearing member 1, is caused by the co-action between the guide means defined by the inclined groove 44 and key 45 to turn relative to the housing 46 and thereby, through the key 42 and keyway 43, to turn the bearing member 1 about its axis. Preferably two diametrically opposed pairs of groooves 44 and keys 45 are provided.

Axial movement of the sleeve 40 is effected by means of the knob 5 which has an internal screw thread 51 co-operating with the external screw thread 41 on the sleeve 40.

A rod 14 made at least in part, of a flexible plastics material is axially movable in the passage through the tubular bearing member by rotating a second control knob 10 and is connected at its outer end to a mirror support member 18, which may comprise a metal die-casting, by means of a grub screw 50. The mirror support member 18 is hinged to the head 4 by a hinge pin 19 which extends transversely to the axis of the passage in the bearing member 1 and to one side of the said axis. A portion of the rod 14 is made of reduced cross-section, or provided with diametrically opposed flats, as shown at 14a to provide sufficient flexibility to enable the mirror support member 18 to be hinged about the hinge 19 as the rod 14 is moved axially. By moving the rod 14 axially, by rotating the knob 10, the mirror support member 18 can be turned around the hinge 19 from an inner position in which the mirror support member lies close against the head 4 to an outer position in which the mirror support member is inclined away from the head 4. Rotation of the rod 14 due to rotation of the knob 10 is prevented by the attachment to the mirror support member 18.

Axial movement of the rod 14 is effected by an elongate tubular nut member 53 which extends into the passage in the bearing member 1 and is screwed on to the screw-threaded inner end portion 13 of the rod 14. The nut member 53 is held captive with the bearing member 1 by providing its end with an enlarged collar portion 52 which is held between a shoulder in said passage and an externally threaded bush 55 screwed into an internal thread 54 at the inner end of the passage. Thus, the nut member 53 is restrained against axial movement relative to the bearing member 1 while rotatable therein. The free inner end of the nut 53 is slideable in an axial bore 57 on the inside of the second control knob 10 and is secured to the knob by means of a screw 56 which passes through the end of the knob 10 and is threaded into the end of the nut member 53. Screw 56 is adjusted so that the base flange 58 of the knob 10 bears against the knob 5 to hold its other end against the inner end of the housing 46 which inner housing end forms a thrust bearing for the knob 5. A compression spring 59 is housed in the knob 5 to take up any play between the two knobs. If desired, after the mirror position has been adjusted, the screw 56 may be further tightened to hold both control knobs against movement.

Secured to the mirror support member 18 by a bolt 20 is an arm 21 which carries a rear-view mirror head 22, whereby the position of the arm 21 relative to the support member 18 may be adjusted. Preferably the opposing faces where indicated at 49 of the arm 21 and the member 18 are formed with interengaging rings of ratchet teeth which are urged into engagement by a spring 48 compressed by the bolt 20 whereby, if the mirror should be accidentally struck, the arm 21 and mirror 22 can ratchet forwards or backwards about the bolt, thereby reducing risk of damage to the person or object struck and to the mirror. If desired, a further adjustment means, known per se, may be provided at 23 between the mirror 22 and the arm 21.

The mirror support member 18 may be provided with a skirt 24 to cover the gap between the head 4 and the support member 18 when the latter is in its outer position.

If desired, instead of or in addition to the skirt 24, a corrugated protective gaiter 60 of flexible plastics material may be provided, being secured at its outer end to the arm 21 and at its inner end between the flange 47 and the head portion 4 of the bearing member.

By rotating the first control knob 5, the orientation of the mirror 22 can be adjusted about a horizontal axis defined by the axis of the bearing member 1, and by rotating the second control knob 10, the mirror can be adjusted about a generally vertical axis defined by the axis of the hinge 19. The arrangement described allows the mirror to be adjusted through an angle of approximately 27° about this generally vertical axis.

Rotation of the knob 5 produces axial movement of the key member 40 through the screw-thread drive, the key member co-operating with the guide means 42, 43 extending axially and the guide means 44, 45 inclined at an acute angle to the direction of axial movement to cause the tubular bearing member 1 to turn about its axis as the key member 40 is moved axially. A fine adjustment of the angular position of the tubular bearing member is therefore achieved and also the screw action of the co-operating threads on the key member and the control knob 5 hold the key member 40 in its adjusted axial position and, through the co-operating keys and key-ways 42, 43, 44 and 45, the bearing member is prevented from turning.

I claim:

1. A mounting arrangement for mounting a vehicle rearview mirror on the outside of a part of a vehicle body, comprising:
    a. a tubular bearing member adapted to be mounted to extend through and be turnable in the body part and having an outer and an inner end and defining a passage extending therethrough,
    b. a mirror support member,
    c. hinge means having an axis extending transversely to the axis of said bearing member and hinging said mirror support member to the outer end of said bearing member for hinging about the axis of the hinge means,
    d. a first rotatable control member connected to the inner end of the bearing member for turning the bearing member about its axis,
    e. a reduction drive connecting said first control member to said bearing member,
    f. a push member axially movable in the passage in said bearing member,
    g. a second rotatable control member,
    h. screw-thread means coupling the inner end of said push member to said second control member,
    i. means holding said second control member axially captive with the inner end of said bearing member, and j. means operative in response to axial movement of said push member to cause the mirror support member to hinge about said hinge means.

2. A mounting arrangement as claimed in claim 1, wherein the push member is a rod which is flexible for at least a part of its length, said rod being screw-threaded at its inner end and having its outer end connected to the mirror support member.

3. A mounting arrangement as claimed in claim 1, wherein the first control member is connected to the bearing member by a screw-thread drive and a key member which is moved axially by the screw-thread drive when the first control member is rotated and which co-operates with guide means inclined at an acute angle to said direction of axial movement to cause the bearing member to turn about its axis as the key member is moved axially.

4. A mounting arrangement as claimed in claim 3, wherein the key member comprises a sleeve slideable on the bearing member and having an external screw-thread in engagement with an internal screw-thread of the first control member, said sleeve and the part of the bearing member on which it slides being provided with a co-operating key and key-way and the sleeve and a housing therearound also being provided with a co-operating key and key-way, both said pairs of co-operating keys and key-ways permitting sliding movement of the sleeve along the bearing member and at least one of said pairs of co-operating keys and key-ways being inclined at an acute angle to the direction of the axis of the bearing member whereby the bearing member turns relative to the housing as the sleeve slides along the bearing member in response to rotation of the first control member.

5. A mounting arrangement as claimed in claim 4, wherein the outer end of said housing forms a thrust bearing in which the outer end of the bearing member can turn while holding the bearing member against axial movement towards the inner end of the housing, and the inner end of the housing forms a thrust bearing for the first control member, and wherein a nut member screwed onto the push member and held captive against axial movement relative to the bearing member is connected to the second control member which is arranged to hold the first control member in position adjacent the inner end of said housing.

6. A mounting arrangement as claimed in claim 5, and including resilient means acting axially between the first and second control members to maintain said first control member in contact with the thrust bearing at the inner end of the housing.

7. A mounting arrangement as claimed in claim 6, wherein the nut member is connected to the second control member by means permitting axial adjustment therebetween.

8. A mounting arrangement as claimed in claim 7, wherein the sleeve and the housing therearound are provided respectively with at least one co-operating key and key-way which are inclined at an acute angle, with a slight helical curvature, to the direction of the axis of the bearing member, the sleeve and the part of the bearing member on which is slides being provided with a straight key slidable in an axial key-way, the nut member being slidable at its inner end in an axial bore in the second control member and being secured to the second control member by means of a screw which passes through the outer end thereof and is threaded into the inner end of the nut member to permit axial adjustment between the first and second control members and permit the two control members to be held against movement by tightening of the said screw, said nut member hving an enlarged collar portion at its inner end which is held between a shoulder in said passage and an externally threaded bush screwed into an internal thread at the inner end of said passage to hold the nut member captive against axial movement relative to the bearing member while rotatable therein, wherein the bearing member is provided at its outer end with an enlarged head which carries said hinge means, the axis of said hinge means is off-centre with respect to the axis of the passage through said bearing member, the mirror support member comprises a metal diecasting, wherein the push member comprises a rod which is made at least in part of a flexible plastics material, which is connected at its outer end to said metal diecasting by means preventing rotation of the rod due to rotation of the second control member and is in screw threaded engagement at its inner end with said nut member, and which is provided with diametrically opposed flats to provide sufficient flexibility for hinging of the mirror support member, and wherein a mirror carrying arm is secured to the mirror support member by a bolt with opposing faces of said mirror carrying arm and mirror support member being urged into engagement by a spring compressed by said bolt to enable the position of the mirror carrying arm relative to the mirror support member to be adjusted, and a protective cover means of flexible plastics material is secured at its outer end to the mirror supporting arm and at its inner end between a flange projecting from said housing and said enlarged head of said bearing member.

* * * * *